United States Patent
Feyeux et al.

(10) Patent No.: US 12,435,307 B2
(45) Date of Patent: *Oct. 7, 2025

(54) NEURAL TISSUE UNIT AND USE OF SUCH A UNIT FOR IMPLANTATION INTO THE NERVOUS SYSTEM OF A MAMMAL

(71) Applicants: UNIVERSITE DE BORDEAUX, Bordeaux (FR); CENTRE NATIONAL DE LA RECHERCHE SCIENTIFIQUE, Paris (FR); INSTITUT D'OPTIQUE THEORIQUE ET APPLIQUEE, Palaiseau (FR)

(72) Inventors: Maxime Feyeux, Talence (FR); Kevin Allessandri, Bordeaux (FR); Pierre Nassoy, Bordeaux (FR); Laurent Cognet, Bordeaux (FR); Abdelhamid Benazzouz, Pessac (FR); Erwan Bezard, Bordeaux (FR)

(73) Assignees: UNIVERSITE DE BORDEAUX, Bordeaux (FR); CENTRE NATIONAL DE LA RECHERCHE SCIENTIFIQUE, Paris (FR); INSTITUT D'OPTIQUE THEORIQUE ET APPLIQUEE, Palaiseau (FR)

( * ) Notice: Subject to any disclaimer, the term of this patent is extended or adjusted under 35 U.S.C. 154(b) by 0 days.

This patent is subject to a terminal disclaimer.

(21) Appl. No.: 18/124,921

(22) Filed: Mar. 22, 2023

(65) Prior Publication Data
US 2023/0257699 A1 Aug. 17, 2023

Related U.S. Application Data

(63) Continuation of application No. 16/462,965, filed as application No. PCT/FR2017/053226 on Nov. 23, 2017.

(30) Foreign Application Priority Data

Nov. 23, 2016 (FR) .................................. 1661378

(51) Int. Cl.
*C12N 5/0793* (2010.01)
*A61K 35/30* (2015.01)
*C12N 5/00* (2006.01)

(52) U.S. Cl.
CPC ............ *C12N 5/0619* (2013.01); *A61K 35/30* (2013.01); *C12N 5/0012* (2013.01); *C12N 2501/39* (2013.01); *C12N 2501/42* (2013.01); *C12N 2506/45* (2013.01)

(58) Field of Classification Search
CPC ................ C12N 5/0619; C12N 5/0012; C12N 2501/39; C12N 2501/42; C12N 2506/45; A61K 35/30; A61L 27/34; A61L 27/3604; A61L 27/52; A61L 27/3675; A61L 27/3687; A61L 27/54; A61P 25/00; A61P 25/16; A61P 25/28
See application file for complete search history.

(56) References Cited

U.S. PATENT DOCUMENTS

| | | | |
|---|---|---|---|
| 2003/0103949 A1* | 6/2003 | Carpenter | A61P 25/28 435/368 |
| 2006/0171935 A1 | 8/2006 | Abeliovic et al. | |
| 2006/0184185 A1* | 8/2006 | Olausson | A61L 27/58 623/23.76 |
| 2009/0169596 A1* | 7/2009 | Svensson | A61P 25/00 424/423 |
| 2013/0022583 A1* | 1/2013 | Wernig | A61P 37/00 435/7.1 |
| 2014/0186414 A1* | 7/2014 | Ingber | A61K 35/28 435/2 |
| 2015/0330970 A1* | 11/2015 | Knoblich | G01N 33/5058 435/395 |
| 2016/0250385 A1* | 9/2016 | Cullen | A61L 27/3878 424/426 |
| 2016/0289635 A1* | 10/2016 | Sasai | C12N 5/0619 |
| 2018/0298330 A1* | 10/2018 | Bolognin | C12N 5/0619 |
| 2018/0334646 A1* | 11/2018 | Song | C12M 21/08 |

(Continued)

FOREIGN PATENT DOCUMENTS

| AU | 2017365847 A1 | 11/2017 |
|---|---|---|
| EP | 3544619 B1 | 9/2021 |

(Continued)

OTHER PUBLICATIONS

Cooper et al ("Progress towards understanding the neurobiology of Batten disease or neuronal ceroid lipofuscinosis," Current Opinion in Neurology 2003, 16:121-128). (Year: 2003).*

(Continued)

*Primary Examiner* — Titilayo Moloye
(74) *Attorney, Agent, or Firm* — Greer, Burns & Crain, Ltd.

(57) ABSTRACT

The invention relates to a neural tissue unit for use in implantation into the nervous system of a human or non-human mammal, wherein said neural tissue unit contains differentiated post-mitotic neuronal cells in an extracellular matrix, said unit being obtained from a cellular microcompartment comprising a hydrogel capsule surrounding the neural tissue unit, and said hydrogel capsule being at least partially removed before use of the neural tissue unit. The invention also relates to a process for preparing such a neural tissue unit.

30 Claims, 4 Drawing Sheets

(56) References Cited

U.S. PATENT DOCUMENTS

| | | |
|---|---|---|
| 2019/0330589 A1 | 10/2019 | Feyeux et al. |
| 2020/0063099 A1 | 2/2020 | Feyeux et al. |

FOREIGN PATENT DOCUMENTS

| | | | |
|---|---|---|---|
| JP | 2015047140 A | 3/2015 | |
| WO | WO-2016140716 A1 * | 9/2016 | ............. A61K 35/28 |
| WO | WO2018096277 A1 | 5/2018 | |
| WO | WO2018096278 A1 | 5/2018 | |

OTHER PUBLICATIONS

Bosch et al ("Induction of GABAergic phenotype in a neural stem cell line for transplantation in an excitotoxic model of Huntington's disease," Experimental Neurology 190 (2004) 42-58). (Year: 2004).*

Yuan et al. "Efficient generation of region-specific forebrain neurons from human pluripotent stem cells under highly defined condition." Scientific Reports vol. 5, Article No. 18550 (2016); Published: Dec. 16, 2015 (Year: 2015).*

Rigamonti et al. "Large-Scale Production of Mature Neurons from Human Pluripotent Stem Cells in a Three-Dimensional Suspension Culture System." Stem Cell Reports. Jun. 14, 2016; 6(6): 993-1008. (Year: 2016).*

McMurtrey, R. "Analytic Models of Oxygen and Nutrient Diffusion, Metabolism Dynamics, and Architecture Optimization in Three-Dimensional Tissue Constructs with Applications and Insights in Cerebral Organoids." Tissue Eng Part C Methods . Mar. 2016;22(3):221-49. Epub Jan. 21, 2016 (Year: 2016).*

Menezes et al. "Expression of neuron-specific tubulin defines a novel population in the proliferative layers of the developing telencephalon." J Neurosci. Sep. 1994;14(9):5399-416. (Year: 1994).*

Winter et al. "Transplantable living scaffolds comprised of micro-tissue engineered aligned astrocyte networks to facilitate central nervous system regeneration." Acta Biomater. Jul. 1, 2016:38:44-58. Epub Apr. 29, 2016., (Year: 2016).*

Dingle et al. "Dingle et al. (Tissue Eng Part C Methods. Oct. 6, 2015;21(12):1274-1283.) ." Tissue Eng Part C Methods. Oct. 6, 2015; 21(12):1274-1283. (Year: 2015).*

Eriksdotter-Jonhagen, et al. "Encapsulated Cell Biodelivery of Nerve Growth Factor to the Basal Forebrain in Patients with Alzheimer's Disease," Dement Geriatr Cogn Disord 2012, pp. 18-28, vol. 33.

Sivachar, "Isolation and Culturing of Glial, Neuronal and Neural Stem Cell Types Encapsulated in Biodegradable Peptide Hydrogel," Topics in Tissue Engineering, Eds. N Ashammakhi, R Reis, & F Chiellini, 2008, vol. 4.

McColgan, et al., "Huntington's disease: a clinical review," European Journal of Neurology, 2018, pp. 24-34, vol. 25.

Petrov, et al., "ALS Clinical Trials Review: 20 Years of Failure. Are We Any Closer to Registering a New Treatment?" Front. Aging Neurosci.,Mar. 22, 2017.

Long, et al., "Alzheimer Disease: An Update on Pathobiology and Treatment Strategies", Cell, Oct. 3, 2019, pp. 312-339, vol. 179, No. 2.

Masten, et al., "Batten disease: an expert update on agents in preclinical and clinical trials," Expert Opinion on Investigational Drugs, 2020, pp. 1317-1322, vol. 29, No. 12.

Onoe, H. et al. "Metre-long cell-laden microfibres exhibit tissue morphologies and functions" Nature Materials, published onlin Mar. 31, 2013, pp. 584-590, vol. 12.

Komatsu, et al., ("Maturation of human iPS cell-derived dopamine neuron precursors in alginate-CA+2 hydrogel," BBA, 2015, pp. 1669-1675, vol. 1850.

Kriks, S. et al. "Floor plate-derived dopamine neurons from hESCs efficiently engraft in animal models of PD" Nature, Nov. 6, 2011, pp. 1-13, vol. 480, No. 7378.

Alessandri, K. et al. "A 3D printed microfluidic device for production of functionalized hydrogel microcapsules for culture and differentiation of human Neuronal Stem Cells (hNSC)" Lab on a Chip, 2016, pp. 1593-1604, vol. 16.

Written Opinion in International Application No. PCT/FR2017/053226, Feb. 21, 2018, pp. 1-10.

Li et al., "Neural lineage differentiation of embryonic stem cells within alginate microbeads," Biomaterials, (2011) pp. 4489-4497, vol. 32.

Okabe et al., "Development of neuronal precursor cells and functional postmitotic neurons from embryonic stem cells in vitro," Mechanisms of Development, (1996) pp. 89-102, vol. 59.

Johnson, et al., "Functional Neural Development from Human Embryonic Stem Cells: Accelerated Synaptic Activity via Astrocyte Coculture," The Journal of Neuroscience, Mar. 21, 2007, pp. 3069-3077, vol. 27, No. 12.

Memberg, S., et al., "Dividing Neuron Precursors Neuron-Specific Tubulin", Journal of Neurobiology, May 1995, pp. 26-43, vol. 27, No. 1.

* cited by examiner

NEURAL TISSUE UNIT AND USE OF SUCH A UNIT FOR IMPLANTATION INTO THE NERVOUS SYSTEM OF A MAMMAL

CROSS-REFERENCE TO RELATED APPLICATIONS

This application is a continuation of U.S. patent application of U.S. patent application Ser. No. 16/462,965 filed May 22, 2019, which is the U.S. national stage application of PCT/FR2017/053226 filed Nov. 23, 2017 and claiming the benefit of foreign priority to French patent application FR 1661378 filed Nov. 23, 2016, the disclosure of all applications is incorporated herein by reference in entirety.

TECHNICAL FIELD

The invention relates to a neural tissue unit, comprising a plurality of post-mitotic neuronal cells, and optionally glial cells, organized in a three-dimensional (3D) network in an extracellular matrix, and to the use thereof as a unit to be implanted into the nervous system of a mammal. Such a neural tissue unit can in particular be used to transplant neuronal cells having a phenotype of interest into the nervous system of a subject, in order to treat neurodegenerative disease.

BACKGROUND

Over the last few decades neurodegenerative diseases have been a major societal challenge, both in terms of understanding the biological phenomena involved and in terms of treatment. Indeed, more and more people are affected by these diseases, with dramatic consequences for the patient and the patient's family and friends.

The generic term "neurodegenerative disease" covers a very large number of diseases, characterized mainly by faster neuronal death than in normal aging, including Alzheimer's disease, Parkinson's disease, Huntington's disease, amyotrophic lateral sclerosis, etc. The nervous system can be affected in a variety of ways, leading to a variety of symptoms including motor, balance, behavioral and/or cognitive disorders.

At present, the causes and mechanisms of neurodegenerative diseases are often poorly understood, making their treatment all the more complex. There is currently no convincing treatment to cure these diseases.

In recent years, development priorities have focused on intracerebral cell therapy, and more particularly on the grafting of neurons into the damaged areas of the brain of people suffering from neurodegenerative diseases. The goal of these transplants is to permanently replace the neurons destroyed by the disease. Thus, localized transplants of embryonic cells or tissues have been successfully performed in several patients with Parkinson's disease. However, this approach involves the use of tissue from aborted fetuses, which raises ethical and logistical issues. Also, many laboratories have turned to human induced pluripotent stem (hIPS) cells as a possible alternative source of quality human cells. The effective differentiation of hIPS into neurons with the necessary phenotype to replace neurons lost by patients is a very active area of research. However, neurons are very fragile cells. The injection of a suspension of neurons generally results in the death of more than 98% of said neurons by anoikis. Alternatively, it was considered to transplant neuronal progenitors, known to be less fragile than neurons. This solution too is unsatisfactory. Indeed, the cell differentiation of neuronal progenitors after implantation is not controlled, and it is not certain that the implanted cells differentiate properly and/or into the desired neuronal type.

There is therefore a need for a neuronal cell implantation system to improve the survival of implanted cells, in particular to permanently replace altered neurons in a patient with neurodegenerative disease.

SUMMARY

While working on the three-dimensional (3D) culture of cells, the inventors discovered that it is possible to improve the survival rate when handling particularly fragile cells such as neurons, by cultivating and handling them not as cell suspensions, but as three-dimensional cell networks. They have developed a neural tissue unit comprising neuronal cells having a phenotype of interest, which can be injected into the nervous system of a patient, in order to integrate therein said neuronal cells with a much higher survival rate than that obtained when injecting a neuronal cell suspension. The neural cell unit developed comprises neuronal cells pre-organized in a 3D network and embedded in an extracellular matrix, which promotes the integration and survival of cells in the nervous system after injection. Indeed, neural cells are transferred to the host nervous system while maintaining the integrity of their local environment, especially interactions between cells and with the extracellular matrix developed within the neural tissue unit. Furthermore, the neural tissue unit according to the invention comprises post-mitotic neuronal cells whose degree of differentiation can be perfectly controlled, limiting the risk of introducing unwanted cell types, responsible in particular for the development of teratomas and tumor growths. Interestingly, it was observed that the neural tissue unit according to the invention is capable of projecting axons into the host tissue, promoting a good integration of cells into said host tissue, and producing a definite functional benefit.

The invention therefore relates to a neural tissue unit for use in implantation into the nervous system of a human or non-human mammal, wherein said neural tissue unit contains differentiated post-mitotic neuronal cells in an extracellular matrix, said unit being obtained from a cellular microcompartment comprising a hydrogel capsule surrounding a single neural tissue unit, and said hydrogel capsule being at least partially removed before implantation of said neural tissue unit.

Thus, the invention relates to a neural tissue unit for use in the treatment of a neurodegenerative disease by implantation, into the nervous system of a human or non-human mammal with neurodegenerative disease, of at least one neural tissue unit containing differentiated post-mitotic neuronal cells in an extracellular matrix, said unit being obtained from a cellular microcompartment comprising a hydrogel capsule surrounding said neural tissue unit, and said hydrogel capsule being at least partially removed before implantation of the neural tissue unit.

In particular, the invention relates to a neural tissue unit for use in the treatment of Parkinson's disease by implantation, into the nervous system of a human or non-human mammal with Parkinson's disease, of at least one neural unit containing post-mitotic neuronal cells differentiated into dopaminergic neurons in an extracellular matrix, said unit being obtained from a cellular microcompartment comprising a hydrogel capsule surrounding said neural tissue unit, and said hydrogel capsule being at least partially removed before implantation of the neural tissue unit.

The invention also relates to a method for the treatment of Parkinson's disease, according to which at least one neural tissue unit containing post-mitotic neuronal cells differentiated into dopaminergic neurons in an extracellular matrix is implanted into the nervous system of a patient with Parkinson's disease, said unit being obtained from a cellular microcompartment comprising a hydrogel capsule surrounding said neural tissue unit, and said hydrogel capsule being at least partially removed before implantation of the neural tissue unit.

Similarly, the invention relates to a neural tissue unit for use in the treatment of Huntington's disease by implantation, into the nervous system of a human or non-human mammal with Huntington's disease, at least one neural tissue unit containing post-mitotic neuronal cells differentiated into GABAergic neurons in an extracellular matrix, said unit being obtained from a cellular microcompartment comprising a hydrogel capsule surrounding said neural tissue unit, and said hydrogel capsule being at least partially removed before implantation of the neural tissue unit.

The invention also relates to a method for the treatment of Huntington's disease, according to which at least one neural tissue unit containing post-mitotic neuronal cells differentiated into GABAergic neurons in an extracellular matrix is implanted into the nervous system of a patient with Huntington's disease, said unit being obtained from a cellular microcompartment comprising a hydrogel capsule surrounding said neural tissue unit, and said hydrogel capsule being at least partially removed before implantation of the neural tissue unit.

Similarly, the invention relates to a neural tissue unit for use in the implantation into the nervous system of a human or non-human mammal, wherein said neural tissue unit contains genetically modified neurons. Such neural tissue units may be used in particular to assist, improve or repair a function of cognition and/or of action in a human or non-human mammal.

The invention also relates to a process for preparing such a neural tissue unit, intended to be implanted into the nervous system of a human or non-human mammal, said process comprising the steps consisting in:

(1) producing cellular microcompartments comprising, within a hydrogel capsule, extracellular matrix and human or non-human mammalian cells capable of differentiating into neural cells, advantageously immune-compatible with the mammal intended to receive the neural tissue unit;

(2) inducing cell differentiation within the cellular microcompartment, so as to obtain neuronal cells having at least one post-mitotic phenotype of interest;

(3) at least partially removing the hydrogel capsule in order to recover the neuronal cells as a neural tissue unit.

The invention also relates to a neural tissue unit implantation kit comprising at least one cellular microcompartment comprising at least one hydrogel capsule surrounding a neural tissue unit according to the invention, and means for at least partial removal of the hydrogel capsule.

The invention also relates to a neural tissue unit implantation kit comprising at least one neural tissue unit according to the invention, preferentially between 10 and 100 and up to 1000, said neural tissue units being loaded into a surgical implantation device capable of implanting the neural tissue units into the nervous system of a mammal.

BRIEF DESCRIPTION OF THE DRAWINGS

(FIG. 4A) is a cylinder test; FIG. 4B is a stepping test; FIG. 4C is a rotameter test; FIG. 4D is an anxiety test/locomotor activity and (FIG. 4E) is an anxiety test/distance.

DETAILED DESCRIPTION

Figure 1:
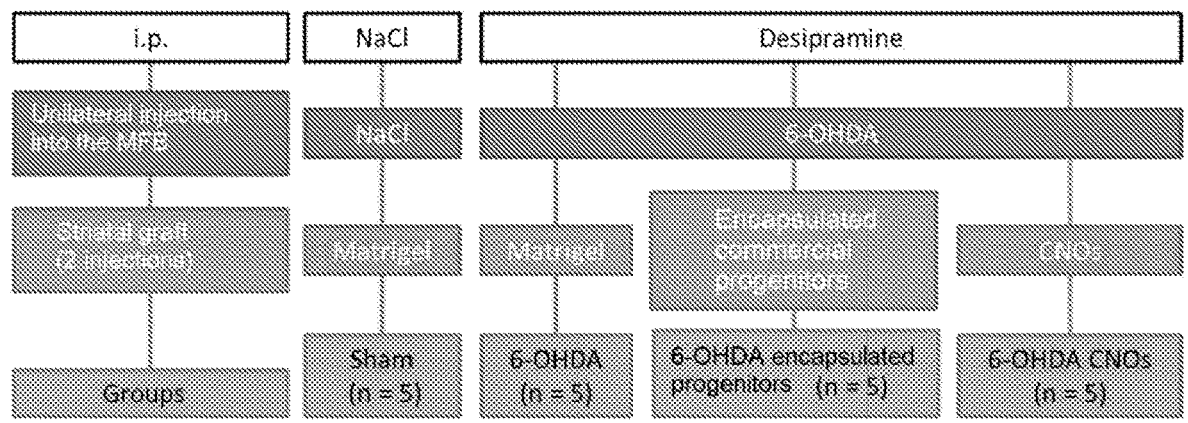
FIG. 1 is a schematic representation of the protocol for preparing different rats rendered parkinsonian, treated or not by injection of neural tissue according to the invention. Sham: control rats; 6-OHDA: rats rendered parkinsonian (negative control); 6-OHDA encapsulated progenitor (or Pro encaps): rats rendered parkinsonian having received neural tissue units according to the invention, from cellular microcompartments in which commercial neuronal progenitor cells have been encapsulated; 6-OHDA CNOs (Controlled Neural Organoids): rats rendered parkinsonian having received neural tissue units (which in this example correspond to CNOs) according to the invention, from cellular microcompartments in which pluripotent cells have been encapsulated before being differentiated into neurons, including dopaminergic neurons.

The present invention discloses a method for implantation, or grafting, into the nervous system of a mammal, of a neural tissue unit in which neural cells are organized in a 3D network. The grafting of neural cells in the form of dense balls promotes their implantation and integration into the host nervous system. The implantation method according to the invention, and more generally the neural tissue unit developed according to the invention, is intended for use in a human or non-human mammal, and more preferentially in a human subject.

Neural Tissue Unit

The invention proposes to use, in lieu of a neuronal cell suspension, a neural tissue unit, for implantation into the nervous system of a subject, in order to treat all sorts of neurodegenerative diseases and/or to assist, improve, repair a cognitive or action function in said subject.

According to the invention, the neural tissue unit to be implanted advantageously comprises differentiated post-mitotic neurons and glial cells, such as astrocytes and/or oligodendrocytes in an extracellular matrix.

"Post-mitotic" neurons are neuronal cells that have lost the ability to divide. The neurons contained in the microcompartment are differentiated in the sense that they have a particular phenotype.

According to the invention, the hydrogel capsule surrounding the neural tissue unit is at least partially removed before implantation into the nervous system of the subject.

In the context of the invention, the "hydrogel capsule" refers to a three-dimensional structure formed from a matrix of polymer chains swollen by a liquid, preferentially water.

Advantageously, the hydrogel used is biocompatible, in the sense that it is not toxic to cells.

Furthermore, the hydrogel capsule must allow the diffusion of oxygen and nutrients to feed the cells contained in the microcompartment and allow them to survive. For example, the hydrogel capsule contains alginate. Preferentially, the capsule only contains alginate. In the context of the invention, "alginate" refers to linear polysaccharides formed from β-D-mannuronate and α-L-guluronate, salts and derivatives thereof. Advantageously, the alginate is a sodium alginate, composed of 80% α-L-guluronate and 20% β-D-mannuronate, with an average molecular mass of 100 to 400 KDa (e.g., PRONOVA™ SLG100) and a total concentration comprised between 0.5% and 5% by mass.

The hydrogel capsule, at the time the neural tissue unit is prepared, protects the cells from the external environment while allowing their controlled differentiation into one or more neuronal types of interest. According to the invention, a hydrogel capsule surrounds a single neural tissue unit. Thus, each neural tissue unit is individually surrounded by a hydrogel capsule. Once the one or more desired cell types have been obtained and the size of the neural tissue in the capsule is sufficient, said capsule is at least partially removed. "At least partially removed" means that the hydrogel capsule is at least partially hydrolyzed, dissolved, pierced, or ruptured so as to allow at least the axons of at least some neural cells of said unit to exit the capsule. Any biocompatible means, i.e. which is non-toxic to cells, allowing hydrolysis, dissolution, piercing and/or at least partial rupture of the hydrogel capsule may be used. For example, it is possible to use saline phosphate buffer, a divalent ion chelator, an enzyme such as alginate lyase, laser microdissection, soluble beads integrated into the hydrogel, etc.

Advantageously, the capsule is completely removed, the neural tissue unit intended to be implanted into the nervous system of a subject thus being devoid of hydrogel.

Preferentially, the extracellular matrix layer of the neural tissue unit forms a gel. The extracellular matrix layer comprises of a mixture of proteins and extracellular compounds necessary for cell culture, and more particularly for neural cell culture. Preferentially, the extracellular matrix comprises structural proteins, such as laminins containing α1 or α4 or α5 and β1 or β2 and γ1 or γ3 subunits, entactin, vitronectin, collagen, as well as growth factors such as TGF-beta and/or EGF. In one embodiment, the extracellular matrix layer consists of, or contains, Matrigel® and/or Geltrex®.

The neural tissue unit according to the invention has the advantage of containing neural cells organized in a 3D network in which interactions between cells and extracellular matrix already exist.

Advantageously, the neural cells of the neural tissue unit form a cluster of neural cells, especially of ovoid, tubular or spherical shape, preferably having a smallest dimension comprised between 10 μm and 1000 μm plus or minus 10%, preferentially between 150 μm and 400 μm plus or minus 10%, even more preferentially between 200 μm and 300 μm plus or minus 10%. These dimensions are particularly favorable to the survival of neurons within the neural tissue unit and optimize the reorganization and vascularization of the graft after implantation. "Smallest dimension" means the minimum distance between two points on either side of the cell cluster.

Preferentially, the neural tissue unit according to the invention contains from 100 to 100,000 neural cells.

Within the neural tissue, the neuronal cells have advantageously one or more phenotypes of interest, chosen according to the use for which the neural tissue unit is intended. According to the invention, the implanted neural tissue unit comprises neuronal cells differentiated according to one or more selected and controlled phenotypes. Preferentially, the neural tissue unit comprises between 10 and 100% of post-mitotic neuronal cells of phenotype(s) of interest, preferentially between 50 and 100%, more preferentially more than 90%. The other cells present in the neural tissue unit may notably be glial cells and/or post-mitotic neuronal cells whose phenotype is different from the phenotype of interest. Advantageously, the neural tissue unit essentially consists of post-mitotic neuronal cells having the same phenotype.

The phenotype of interest of the post-mitotic neuronal cells depends on the destination of said unit. Thus, in the case of use in cell therapy, the phenotype of the neurons corresponds advantageously to the phenotype of the failing cells to be replaced.

Indeed, the neural tissue unit according to the invention can advantageously be used in cell therapy, for the treatment of a neurodegenerative disease, such as Parkinson's disease, Huntington's disease, amyotrophic lateral sclerosis (ALS), Alzheimer's disease or neuronal ceroid-lipofuscinoses, such as Batten disease.

Thus, for the treatment of Parkinson's disease, the neural tissue unit contains advantageously dopaminergic neurons. Preferentially, the post-mitotic neurons contained in such a neural tissue unit are essentially dopaminergic neurons.

In the context of the invention, "essentially" means at least 90% of the cells, preferentially at least 95%, even more preferentially at least 99%.

For the treatment of Huntington's disease, the neural tissue unit advantageously contains GABAergic neurons. Preferentially, the post-mitotic neurons contained in such a neural tissue unit are essentially GABAergic neurons.

The neural tissue unit according to the invention may also contain genetically modified neural cells. Thus, it is possible to implant, into the nervous system of a subject, neural cells in which the expression of one or more genes has been inhibited or increased. It is also possible to implant neural cells into which a heterologous gene has been introduced, so as to introduce into the nervous system a function that is normally absent.

Such a neural tissue unit, containing genetically modified cells, is of particular interest for assisting, improving or repairing a cognition and/or action function, such as a failing or insufficient cognition and/or action function in the subject considered.

For example, in the treatment of Huntington's disease, the genetic cause being known (expansion of CAG triplet repeats within the gene encoding huntingtin), it is possible to remove cells from the patient to prepare neural tissue units according to the invention, comprising GABAergic neurons in which the deficient gene has been corrected, before performing an autograft of said neural tissue units.

For patients with Parkinson's disease, it is possible to prepare neural tissue units comprising dopaminergic neurons modified to express light-sensitive channels, such as rhodopsin channels, to control the activity of the grafted neural tissue by simple illumination, in a manner similar to deep brain stimulation but less invasive. Generally, controlling the activity of the grafted neural tissue, particularly by expression of light-sensitive channels, can be beneficial for all potential applications.

Neural Tissue Unit Implantation Kits

The invention also proposes a neural tissue unit implantation kit comprising at least one cellular microcompartment comprising a hydrogel capsule surrounding a neural tissue unit according to the invention, and means for at least partial removal of the hydrogel capsule (hydrolysis, dissolution, piercing and/or rupture).

The practitioner who must use the neural tissue unit according to the invention can thus, at the time of use and according to need, at least partially remove the hydrogel capsule to obtain the neural tissue unit(s) ready to be implanted into the nervous system of a subject.

Also, the implantation kit according to the invention may also contain a surgical implantation device capable of implanting a neural tissue unit into the nervous system of a mammal.

The invention also proposes a neural tissue unit implantation kit comprising at least one neural tissue unit according to the invention, preferentially between 1 and 10,000, more preferentially between 10 and 1000 neural tissue units loaded in a surgical implantation device capable of implanting the neural tissue unit(s) into the nervous system of a mammal. Advantageously, the quantity of neural tissue units implanted depends on the size of the host brain and the application.

Neural tissue units may optionally be frozen before being introduced into the surgical implantation device and/or frozen at the same time as the surgical implantation device. Of course, a thawing step is then necessary before the neural tissue units are implanted into the nervous system of the subject.

Preparation Process

The invention also relates to a process for preparing neural tissue units capable of being implanted into the nervous system of a mammal. More specifically, the invention proposes to produce neural tissue units containing post-mitotic neuronal cells whose phenotype(s) depend on the use for which said units are intended. According to the invention, it is possible to produce cellular microcompartments comprising a hydrogel capsule surrounding neural cells, in particular from differentiated mammalian cells that are reprogrammed before or after encapsulation and then differentiated into one or more neural types within the hydrogel capsule.

The capsule is then at least partially removed to allow the neural cells to implant into the host tissue after transplantation.

Generally, the process for preparing such a neural tissue unit, intended to be implanted into the nervous system of a human or non-human mammal, according to the invention comprises the steps consisting in:
(1) producing cellular microcompartments comprising, within a hydrogel capsule, extracellular matrix and human or non-human mammalian cells capable of differentiating into neural cells, advantageously immune-compatible with the mammal intended to receive the neural tissue unit;
(2) inducing cell differentiation within the cellular microcompartment, so as to obtain post-mitotic neuronal cells having at least one phenotype of interest;
(3) at least partially removing the hydrogel capsule in order to recover the neural cells as a neural tissue unit.

Any method for producing cellular microcompartments containing within a hydrogel capsule extracellular matrix and cells capable of giving rise to neural cells may be used. In particular, it is possible to prepare microcompartments with the microfluidic device described in Alessandri et al. 2016 ("A 3D printed microfluidic device for production of functionalized hydrogel microcapsules for culture and differentiation of human Neuronal Stem Cells (hNSC)", Lab on a Chip, 2016, vol. 16, no. 9, pp. 1593-1604).

In a particular embodiment, the encapsulated cells are pluripotent stem cells, such as induced pluripotent stem (IPS) cells, or embryonic stem (ES) cells. In the context of the invention, "induced pluripotent stem cells" (IPS cells) are defined as pluripotent stem cells obtained by genetic reprogramming of differentiated somatic cells and having a morphology and potential for self-renewal and pluripotency partially similar to those of embryonic stem cells. These cells are notably positive for pluripotency markers, such as alkaline phosphatase staining and expression of the proteins NANOG, SOX2, OCT4 and SSEA3/4. The processes for obtaining induced pluripotent stem cells are well known to the skilled person and are notably described in articles by Yu et al. (Science, 2007, 318 (5858): 1917-1920), Takahashi et al. (Cell, 2007, 131(5): 861-872) and Nakagawa et al. (Nat Biotechnol, 2008, 26(1): 101-106). In the case of embryonic stem cells, said pluripotent stem cells are cells derived from the internal cell mass of the blastocyst and which have the ability to lead to the formation of all tissues of the organism. The pluripotency of embryonic stem cells can be assessed by the presence of markers such as the transcription factors OCT4 and NANOG and surface markers such as SSEA3/4, Tra-1-60 and Tra-1-81. Embryonic stem cells can be obtained without destroying the embryo from which they originate, for example by using the technique described by Chung et al. (Cell Stem Cell, 2008, 2(2): 113-117). In a particular embodiment, and for legal or ethical reasons, stem cells are defined as excluding human embryonic stem cells.

Alternatively, it is possible to encapsulate neural progenitor cells, i.e. stem cells already engaged in cell differentiation into neural cells. In another embodiment, it is possible to encapsulate differentiated cells, which will be forced to differentiate into neural cells by transdifferentiation. It is also possible to encapsulate cells capable of forming glial cells, such as somatic cells.

In another embodiment, it is possible to use differentiated cells, which will be reprogrammed into pluripotent stem cells before or after encapsulation. Since the neural tissue units must be able to be implanted for a long time in the nervous system of a patient, it is preferable to start with cells immune-compatible with said subject, to avoid any risk of rejection. In a particular embodiment, the cells used to prepare the neural tissue units were previously collected from the human or non-human mammal in which said neural tissue unit(s) is (are) to be implanted.

In all cases, once the cellular microcompartments have been obtained, the cells it contains must undergo cell differentiation in order to differentiate them into neuronal cells according to one or more desired phenotypes.

Any method conventionally used in 2D culture (Petri dish and others) to force cell differentiation can be used, such as the method described in Chambers et al. ("Highly efficient neural conversion of human ES and iPS cells by dual inhibition of SMAD signaling", Nature Biotechnology 27, 275-280 (2009)), or in Lippmann et al. ("Defined human pluripotent stem cell culture enables highly efficient neuroepithelium derivation without small molecule inhibitors", Stem Cells 2014). In a particular embodiment, the differentiation medium contains 24(S),25-Epoxycholesterol, in order to improve dopaminergic differentiation.

Preferentially, the cellular microcompartments are cultured for at least three weeks in differentiation medium and before any removal of the hydrogel capsule.

Generally, the pluripotent cellular microcompartments can be frozen before use and thawed as needed.

In an exemplary embodiment, it is possible to induce cell differentiation so as to force the cells within the cellular microcompartment to differentiate into dopaminergic cells ("Generating regionalized neuronal cells from pluripotency, a step-by-step protocol" Kirkeby et al. Frontiers in Cellular Neuroscience 2012). The neural tissue units derived from such cellular microcompartments can then be implanted into the nervous system of a subject with Parkinson's disease, in order to at least partially replace the failing dopaminergic neurons of said subject.

In another exemplary embodiment, it is possible to induce cell differentiation so as to force the cells within the cellular microcompartment to differentiate into GABAergic cells ("Derivation of striatal neurons from human stem cells" Viegas et al. Prog Brain Res 2012). The neural tissue units derived from such cellular microcompartments can then be implanted into the nervous system of a subject with Huntington's chorea to at least partially replace the failing GABAergic neurons of said subject.

The process for preparing neural tissue units according to the invention may also comprise the additional step consisting in:
  loading a surgical implantation device with at least one neural tissue unit, preferentially between 10 and 1000, more preferentially between 10 and 100 neural tissue units.

Thus, the implantation device is ready to be used to transplant neural cells into the nervous system of a subject.

According to the invention, it is possible to freeze the neural cells as neural tissue units before or after at least partial removal of the hydrogel capsule. Of course, the neural tissue units can be used directly after the preparation process, without first being frozen.

Advantageously, the preparation process according to the invention comprises the intermediate step consisting in:
  confirming the phenotype of the neural cells contained in the hydrogel capsule, after the cell differentiation step.

For example, in the case of one or more neural tissue units containing dopaminergic neurons, it is possible to non-invasively measure the activity of the implantable neural units before transplantation by removing the supernatant from the culture medium, and by performing microdialysis analysis coupled with HPLC.

More generally, it may be advantageous to characterize the electrical activity of the neurons representative of the sample by the so-called "patch-clamp" technique based on the recording of ionic currents transiting through cell membranes.

The neural tissue units being advantageously cultured in batches, under identical conditions, it is also possible to carry out more detailed analyses, in particular by immuno-cytochemistry, RNA and/or proteomic sequencing, on a representative sample of the population of neural tissue units considered, in order to ensure the exact quality of the differentiation. For example, in the case of neural tissue units containing dopaminergic neurons, it is possible to perform immunocytochemical analysis targeting tyrosine hydroxy-lase, FOXA2 and/or NURR1 ("Dopamine neurons derived from human ES cells efficiently engraft in animal models of Parkinson's disease" Kriks et al. 2012).

It is thus possible to verify that the post-mitotic neurons and/or the neural cells in fact have the desired phenotype(s) before the step of implantation into the nervous system of the subject.

Transplantation of Neural Tissue Unit(s) into the Nervous System of a Human or Non-Human Mammal The invention also proposes a process for implanting, or grafting, neural tissue unit(s) into the nervous system of a subject, and in particular a human, in need thereof. Indeed, the neural tissue units according to the invention can advantageously be used for the treatment of neurodegenerative diseases. In the context of the invention, the term "treatment" refers to curative, symptomatic or preventive treatment. As used here, the term "treatment" of a disease refers to any act intended to extend the quality and/or life of patients. Treatment can be designed to eradicate the disease, to stop or delay the progression of the disease and/or to promote regression of the disease. The term "treatment" of a disease also refers to any action intended to reduce the symptoms associated with the disease. The patient to be treated is any mammal, preferably a human being.

Generally, any neural cell transplant method can be used to implant the neural tissue units into the nervous system of the subject. In particular, it is possible to use a cannula, such as a glass cannula, into which the neural tissue units have been loaded beforehand.

In a particular embodiment, the implementation comprises the steps consisting in
  Anesthetizing and/or immobilizing the subject to receive the neural tissue unit(s);
  Opening the subject's skull;
  Positioning the implantation device containing the neural tissue units above the graft area, for example using a so-called "stereotactic" device;
  Inserting the implantation device into the graft area;
  Injecting the neural tissue units while gradually removing the implantation device from the graft area.

Advantageously, the injection step is controlled by a microfluidic pump and motorization system to manage the insertion depth of the implantation device into the nervous system of the subject, to provide the necessary space for the neural tissue units in said nervous system, which are thus deposited in the withdrawal trajectory of the implantation device.

In a particular embodiment, the implantation device consists of a glass cannula having an inner diameter comprised between 0.3 and 2 mm, preferentially 0.4 mm, and an outer diameter of between 0.4 and 3 mm, preferentially 0.55 mm. The cannula has advantageously a rounded or chamfered tip and its surface is silanized with a fluorinated compound, in order to reduce the risk of tissue damage when the cannula is inserted and to reduce the risk of plugging by a blood clot. The neural tissue units are loaded, for example, from the front into the cannula. The cannula is inserted in position in the subject's skull.

Advantageously, during the same transplant, between 10 and 40 neural tissue units are implanted, each neural tissue unit comprising preferentially between 1000 and 10,000 neural cells. Of course, the number of neural tissue units to be implanted is adapted according to the subject and the disease to be treated and/or the cognition or action function to be modified. Several transplants, more or less distant in time, can also be considered. Similarly, grafts can be performed simultaneously or over a short period of time in different areas of the nervous system of the subject.

EXAMPLES

1. Production of Implantable Neural Tissue Units for the Treatment of Parkinson's Disease:

Progenitors are obtained according to the method published by Kriks et al. ("Dopamine neurons derived from human ES cells efficiently engraft in animal models of Parkinson's disease" Kriks et al. 2012), using 24(S),25-Epoxycholesterol (concentration from 1 to 10 µM) on cultures derived from human induced pluripotent stem cells, to optimize differentiation into dopaminergic neurons.

The progenitors thus obtained are encapsulated according to the method published by Alessandri et al., 2016 ("A 3D printed microfluidic device for production of functionalized hydrogel microcapsules for culture and differentiation of human Neuronal Stem Cells (hNSC)", Lab on a Chip, 2016).

Once the cellular microcompartments containing the progenitors are obtained, a so-called "terminal" differentiation into dopaminergic neurons is carried out according to the method published by Kriks et al. ("Dopamine neurons derived from human ES cells efficiently engraft in animal models of Parkinson's disease" Kriks et al. 2012), using again 24(S),25-Epoxycholesterol (concentration from 1 to 10 µM).

Particular attention is paid to changing culture media, as the proliferation of cells in the cellular microcompartments increases the rate at which the medium is consumed by the implantable neural units during their preparation.

All differentiation takes place in the cellular microcompartments, but it is possible to decapsulate and re-encapsulate the cells, as long as the cells support suspension dissociation of single cells (or up to a maximum of one week after addition of gamma secretase inhibitor and/or Notch signal such as DAPT, CoumpoundE or other molecules promoting terminal differentiation).

The cellular microcompartments thus obtained after three weeks of differentiation are treated by successive rinses in PBS solution to dissolve the hydrogel shell and recover the neural tissue units before injection.

Production of the Injection Cannula:

A 5 cm section of borosilicate capillary (inner diameter: 0.4 mm, outer diameter 0.55 mm) is cut with a ceramic blade.

The front face of the capillary is rounded with aluminum oxide sanding paper for 12 µm and then 1 µm optical fiber.

The glass is activated via plasma treatment for 5 minutes, then silanized in the gas phase by deposition of 20 µl of 1H,1H,2H,2H-Perfluorooctyltrichlorosilane near the tip positioned in a sealed glass Petri dish.

After 30 minutes of reaction, the injection cannula is ready and mounted on a standard stereotaxic device linked to a 10 µl syringe (Hamilton), powered by a syringe pump (Harvard Apparatus). The injection arm of the stereotactic device is also motorized (PI).

Surgery: Standard neural transplantation surgery is then performed on a rat. Such a surgical method comprises the steps according to which:

1) Medicated (ketamine) sleep and anesthesia are induced in the animal
2) The animal is precisely positioned using stereotactic equipment.
3) The animal's skull is shaved, then treated with betadine, then opened with a scalpel to remove the skin from the skull, then a micro drill is used to form a window in the skull bone, allowing the cannula to pass through. The meninges are carefully spread without damaging the cortex that outcrops just below.
4) The cannula connected to a syringe is positioned above the graft area using a stereotactic device.
5) The neural tissue units are loaded from the front into the cannula (about 80 capsules or 10,000 to 800,000 cells). The graft represents 4 µl in total, or 4 cm of height in the cannula. Two sites are injected unilaterally in the rat, into the striatum at a distance of about 1 mm.
6) The cannula is inserted into the animal's skull in the first site within the ventral striatum. During the 2 µl injection, the cannula is removed simultaneously with the injection using a microfluidic pump system and motorized management of the cannula depth, to free up the space necessary for the graft, which is thus deposited in the withdrawal trajectory by about 2 mm.
7) The cannula is left in place for one minute before being gently removed.
8) The second site is then implanted using the same procedure.
9) The rat's skin is sutured (three to five stitches) after rinsing the wound with betadine.

Transplant Results:

The demonstration being survival to the transplantation process of mature human neurons, the animal is sacrificed one week after surgery to study the survival and implantation of the transplant by immunocytochemistry on a slice of brain cut with a vibratome in the transplant trajectory.

Survival estimated on the basis of graft size (known before transplantation) is greater than 84%±33%, compared to the 2% survival rate obtained with the methods for grafting mature dopaminergic neurons in suspension (D. M. Marchionini et al., "Interference with anoikis-induced cell death of dopamine neurons: implications for augmenting embryonic graft survival in a rat model of Parkinson's disease." J Comp Neurol 464, 172-179 (2003).) The phenotype of the neurons is preserved (Tyrosine Hydroxylase positive). In addition, axonal processes of several millimeters are visible, indicating that neurons immediately began to integrate into the rat's brain.

2. Transplantation of Neural Tissue Units Comprising Neuronal Cells for the Treatment of Parkinson's Disease 2.1—Surgical Protocol Rats (aged 7/8 weeks) are housed in a temperature-controlled room in a 12-hour light/dark cycle with ad libitum access to food and water.

FIG. 1 summarizes the different procedures performed on these rats to obtain parkinsonian rats, to which grafts of neural tissue according to the invention will then be applied.

Preparation of Parkinsonian Rats

Animals are fasted before surgery. Food, including dietary supplements, and water are retained. Each animal is placed in an anesthesia chamber fed by a continuous flow of air (0.3 L/min)+oxygen (0.3 L/min) and 2% isoflurane. Xylocaine (7 mg/kg, s.c.), borgal (7.5%, i.m.) and buprenorphine (0.1 mg/kg, s.c.) are injected. The animal is then kept under anesthesia with an isoflurane-based anesthetic administered by a volume-controlled respirator. The central temperature is recorded rectally during surgery. Heating pads are used to maintain body temperature, if necessary. Ophthalmic ointment (lipoic ophthalmic gel) is administered to each eye. The fur is cut from the skull to the neck. After the loss of consciousness, the animal is placed in a stereotactic frame (Kopf) and its head fixed in position using ear bars.

Figures 2A, 2B:
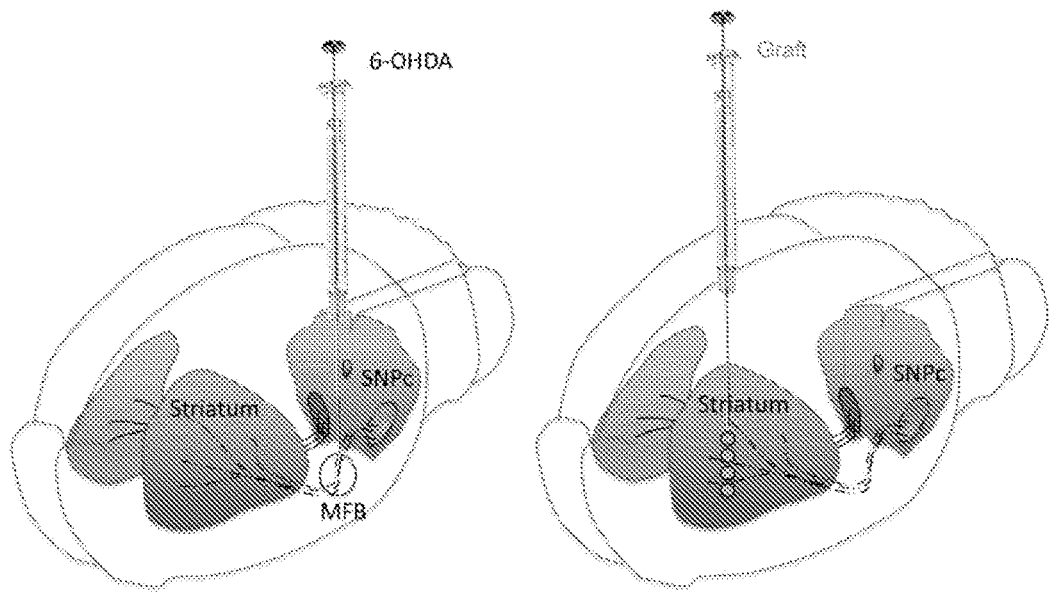
FIG. 2A and FIG. 2B depict the lesion (FIG. 2A) and transplant (FIG. 2B) protocol applied to obtain parkinsonian rats and to transplant the neuronal tissues according to the invention.

Using a Hamilton 1702N syringe (Ga22s/51 mm/PST3) coupled with a Legato 101 automatic injector (KD scientific), the rats are rendered pseudo-parkinsonian by unilateral stereotaxic injection of 2.5 µl 6-hydroxydopamine (6-OHDA) (Sigma, 5 mg/ml in sterile NaCl, 0.9%) with 0.1% ascorbic acid in the medial forebrain bundle (MFB) at coordinates −2.8 mm antero-posterior, 2 mm lateral and 8.4 mm dorsoventral according to the Paxinos and Watson brain atlas at a rate of 1 µl/min (FIG. 2A).

After the injection, the needle is left in place for 5 minutes before being slowly removed from the brain. Thirty minutes before surgery, the animals receive intraperitoneally (i.p.) an injection of desipramine (25 mg/kg, 5 ml/kg) dissolved in 0.9% NaCl, to protect the noradrenergic system.

When the injection is complete, the skin is closed with a suture. The animal is then allowed to recover from the anesthesia.

Transplants

Preserving the microenvironment of the mature neurons throughout the transplant procedure allows survival and connection to the host brain.

A group of rats (6-OHDA encapsulated progenitors) receives a graft of neural tissue units according to the invention comprising commercial neuron progenitor cells (Cellular Dynamics iCell DopaNeurons) encapsulated and matured for two weeks in vitro before use.

A second group of rats (6-OHDA CNOs) receives a graft of neural tissue units according to the invention comprising Controlled Neural Organoids (CNOs) produced and sorted in the laboratory.

The neural tissue units comprising CNO cells were obtained by encapsulating pluripotent cells or naïve pluripotent cells in alginate and differentiating them into neuron progenitor cells according to the protocol below:

The entire culture is carried out at 37° C., under 5% CO2, and humidity saturation above 95%.

D0-D3 (day 0 to day 3): N2B27 (for 500 mL of medium: 250 mL of Neurobasal medium+250 mL of Dmem F12 medium with glutamax+1 N2 supplement+1 B27 supplement+0.5 microM LDN-193189+10 microM SB431542+100 ng/mL Shh (Sonic Hedgehog)+100 ng/mL FGF-8 (Fibroblast Growth Factor 8)+2 microM purmorphamine+10 microM 24 (S),25-Epoxycholesterol D3-D9: N2B27+LDN+SB+Shh+FGF-8+purmorphamine+CHIR+24(S),25-Epoxycholesterol D9-D10: N2B27+LDN+CHIR+24(S),25-Epoxycholesterol D10-D15 or more: N2B27+cAMP+AA+GDNF+BDNF+FGF-20+TGFbeta+trichostatin+CpE+24(S),25-Epoxycholesterol

TABLE 1

List of abbreviations and acronyms

| Abbreviation/acronym | Description |
|---|---|
| AA | Ascorbic acid |
| cAMP | Cyclic adenosine monophosphate - intracellular signal transduction |
| BDNF | Brain Derived Neurotrophic Factor |
| CHIR | GSK3 inhibitor |
| DMEM | Dulbecco's Modified Eagle Medium |
| DMSO | Dimethyl Sulfoxide |
| ECM | Extracellular matrix |
| FGF-20 | Fibroblast growth factor 20 |
| FGF-8 | Fibroblast growth factor 8 |
| GDNF | Glial Derived Neurotrophic Factor |
| hESC | Human Embryonic Stem Cells |
| HS415 | Human ES cell line |
| LDN193189 | smad1/8/5/8 inhibitor |
| NEAA | Non-Essential Amino Acids |
| PBS | Phosphate Buffered Saline |
| PS | Penicillin/Streptomycin |
| RT | Room Temperature |
| SB431542 | Anti TGF beta |
| Shh | Sonic hedgehog |
| TGFbeta3 | transforming growth factor type 3 |

TABLE 2

Final concentrations

| Small molecules or growth factors | Final concentrations at the cell level |
|---|---|
| cAMP | 0.5 mM |
| Ascorbic acid AA | 200 µM |
| BDNF | 10 ng/ml |
| Chir99021 | 3 µM |
| CompoundE | 1 µM |
| FGF-20 | 5 ng/ml |
| FGF-8 | 100 ng/ml |
| GDNF | 10 ng/ml |
| LDN -193189 | 0.5 µM |
| purmorphamine | 2 µM |
| rock inhibitor | 10 µM |
| SB431542 | 10 µM |
| Shh | 100 ng/ml |
| TGFbeta3 | 1 ng/ml |
| Trichostatin A | 10 nM |
| 24(S),25-Epoxycholesterol | 10 µM |

Before the injection of the neural tissue units (6-OHDA encapsulated progenitors and 6-OHDA CNOs), the alginate capsules of the cellular microcompartments are dissolved simply by exchanging the medium with PBS.

Injection configurations are a syringe or cannula mounted on stereotactic equipment. The neural tissue units are loaded into the injection cannula by drawing the injected volume (25 CNO~1 µL) into the cannula body.

To inject the 4 injection sites on 2 trajectories (FIG. 21B): 4 µl with progenitors (group 3), encapsulated progenitors (6-OHDA progenitor) or CNOs (6-OHDA CNOs) are injected into the striatum at the following coordinates: A/P+1.2; M/L −2.6; D/V −5.0 (3 ul) and −4.0 (3 ul); and A/P+0.5; M/L −3.0; D/V −5.0 (3 ul) and −4.0 (3 ul); tooth bar −2.4 (Grealish et al., 2014).

Post Operative Procedure

Four groups of rats are formed from immunocompromised rats (NR or naked rats):

"Sham": non-lesioned rats

"6-OHDA": rats whose dopaminergic neurons in the right hemisphere have been chemically killed, no transplantation (control experiment)

"CNO" or "6-OHDA CNO": rats whose right hemispheric dopaminergic neurons have been chemically killed, and grafted into the right striatum with neural tissue units according to the invention comprising approximately 250,000 cells.

"Pro encaps" or "6-OHDA encapsulated progenitors": rats whose right hemispheric dopaminergic neurons have been chemically killed, and grafted into the right striatum with neural tissue units according to the invention comprising approximately 250,000 Cellular Dynamics iDopaneurons cells matured 2 weeks in capsules.

Each animal is closely observed and kept warm until it has regained its righting and swallowing reflexes. Animals are cared for by experienced technicians with easy access to experienced veterinary support.

Other drugs for the clinical management of the animal are used if necessary. Each drug, dose, route and site of administration is documented in the surgical records.

Surgical incisions are monitored for signs of infection, inflammation and general integrity at least once a day (until the incisions are healed). All observations made and results are documented in the surgical records. The study coordinator is informed of any anomalies. The study monitor shall be informed as soon as reasonably possible of any anomaly.

Checks on the condition of the animals are carried out twice a day (from 11 am to 10 pm). Animals are evaluated according to criteria of fair and humane treatment. Appropriate veterinary support is provided if necessary. Any animal showing signs of severe pain or distress that are likely to last is euthanized quickly. They are then subjected to coarse necropsy. In addition to necropsy, the brain is removed for histology and treated as indicated in the Euthanasia section. Every reasonable effort is made to apply the criteria of fair and humane treatment to prevent an animal from being found dead.

2.2—Behavioral Studies

Amphetamine-Induced Rotation (Adapted from Grealish et al., 2014).

Only animals with more than 5 revolutions per minute after injection of 6-hydroxydopamine (6-OHDA) into the median telencephalic bundle were considered to have successfully suffered a lesion. Rotational bias after systemic injection of amphetamine (2.5 mg/kg, intraperitoneal, Apoteksbolaget) was recorded using an automated system (Omnitech Electronics). Animal rotation was recorded for 90 minutes, only complete body turns were counted and then expressed in net turns per minute, rotations to the side of the lesion (clockwise) are counted positively.

Stepping Test

Each rat is placed on a flat surface; its hind paws are raised by gently holding the tail so that only one leg is allowed before touching the table. The experimenter pulls the rat back one meter at a regular rate. Adjustment movements of the front paws before contralateral and ipsilateral are counted independently on their respective paths. The data will be presented as a percentage of adjustment movement using the paws by calculating the contralateral/(contralateral+ipsilateral) ratio.

Cylinder Test

The cylinder test is performed by placing each animal in a glass cylinder and counting the number of touches on the wall of the cylinder for 5 minutes of the ipsilateral and contralateral paws, the result is expressed by calculating the contralateral/(contralateral+ipsilateral) ratio, on a maximum of 20 touches.

The "Open Field" Actimeter

Spontaneous locomotor activity is measured using a photoelectric actimeter (Actitrack, Panlab, S. L., Barcelona, Spain). The device consists of a transparent cage connected to a photoelectric cell. The light beams detect movement, and the total number of horizontal movement detections of each rat is recorded daily over two successive 10-minute sessions. All actimeter tests are performed in an isolated room between 8:00 am and 1:00 pm. The first three-day phase allows for habituation. The fourth day is considered as the test day. The first 10-minute session is considered as the daily habituation. Only the locomotor activity recorded during the second 10-minute session is used for data analysis.

2.3—Post-Mortem Study Evaluations—Histological Analysis

After the end of the experiments, the rats are sacrificed by intracardiac infusion of 4% paraformaldehyde, the brains collected, frozen in isopentane at −45° C. and stored at −80° C. The infused brains are cut with a cryostat into 50 μm coronal sections.

Validation of Dopaminergic (DA) Lesion

The loss of DA cells in the central nervous system and the loss of DA fibers in the striatum are verified by immunohistochemistry of tyrosine hydroxylase (TH) as described above (Bouali-Benazzouz et al., 2009). The number of Tyrosine Hydroxylase (TH) immunoreactive cells is obtained by applying the optical fractionation method using a Leica DM6000B microscope with Mercator Pro software (ExploraNova, version 7.9.8).

Validation of the Graft

Rat brain sections and CNOs are subjected to immunohistochemical assays using antibodies to analyze cell survival, possible proliferation and phenotypic maturation of grafts (identified using human cytoplasmic marker (HCM)) and characterized by conventional DA markers (TH, DAT, FOXA2). Pan-neuronal markers (MAP2, NeuN), serotonin (FOXG1), proliferative markers Ki-67/PCNA and a glial marker (human-specific GFAP).

Neuronal Survival Test

Figure 4A:
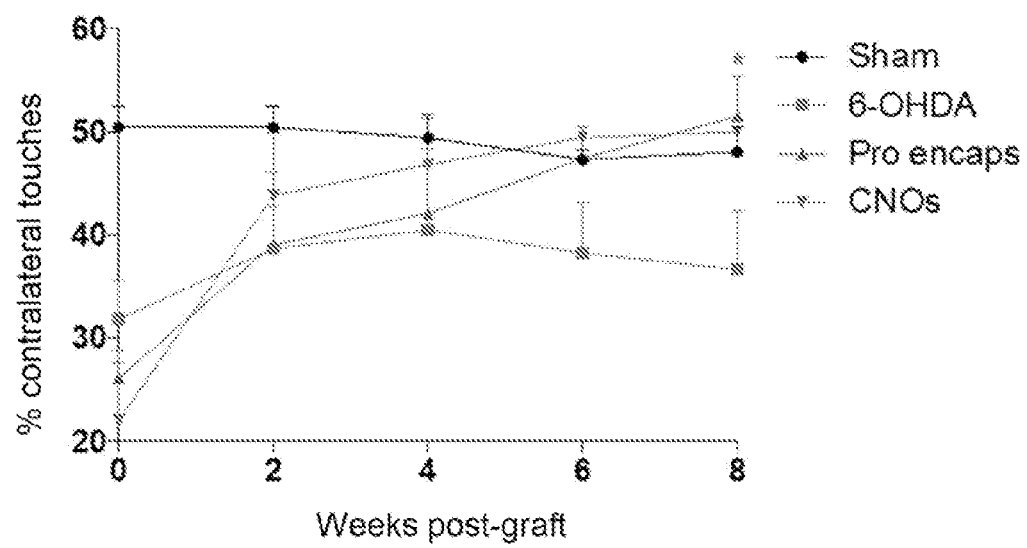
FIG. 4A-4E show the results obtained for behavioral tests performed on rats rendered parkinsonian having or not received a graft of neural tissue unit according to the invention.
Figure 4B:
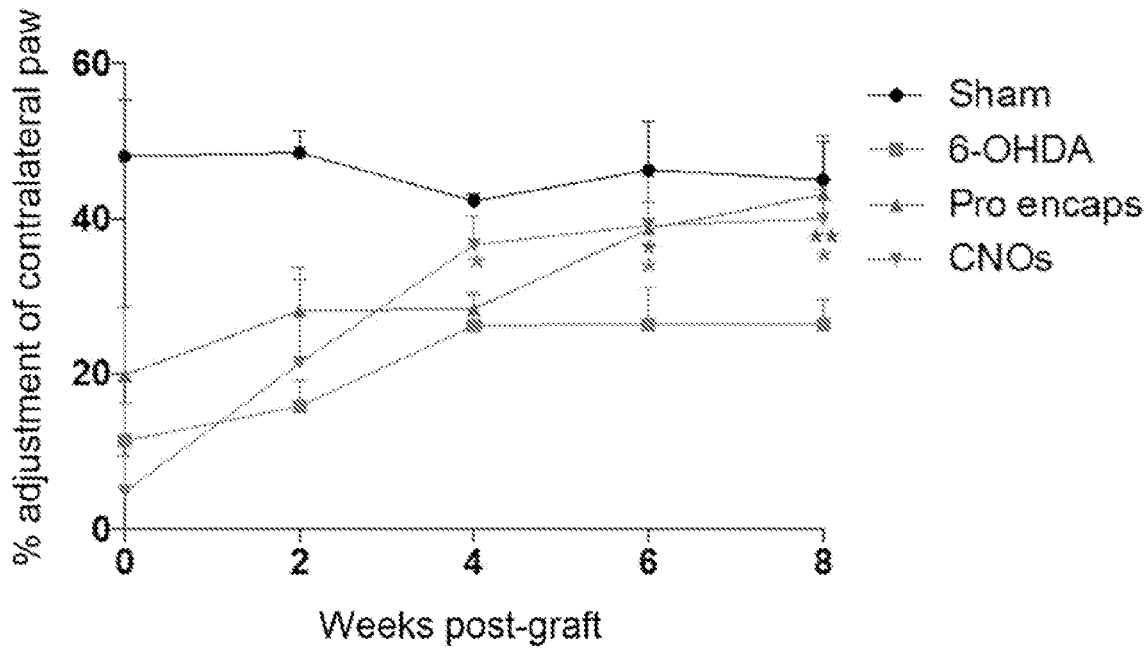
Figure 4C:
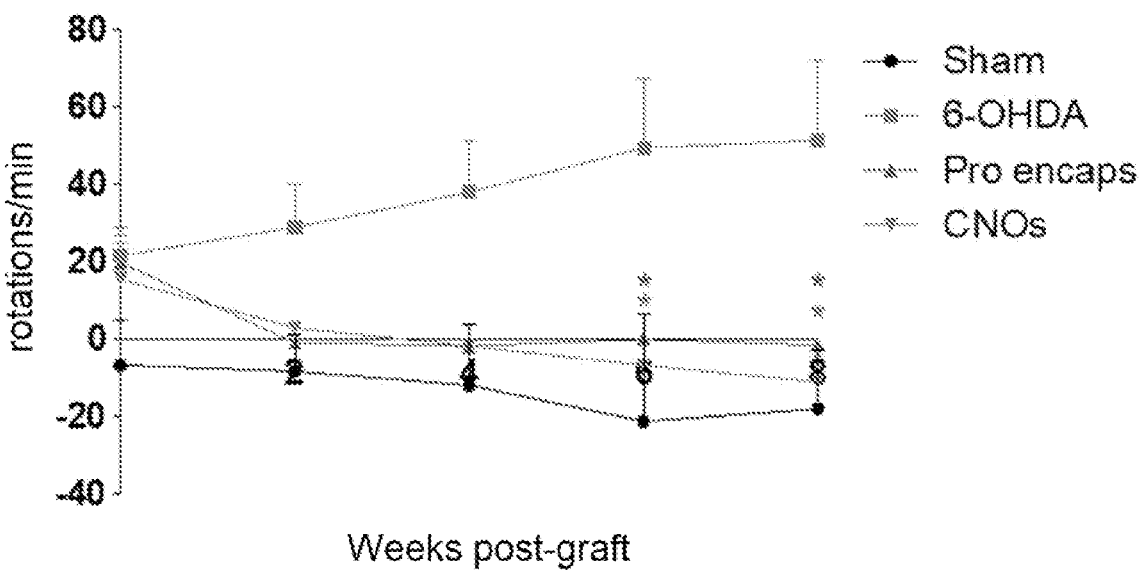

6 CNO rats were sacrificed 6 days after transplantation to evaluate neuronal survival after transplantation Results Results of Behavioral Studies The behavioral studies show a very positive effect of grafts according to invention in grafted rats (6Pro-encaps and CNOs) since a behavioral correction is obtained in 4 to 6 weeks for the stepping test (FIG. 4B) and the cylinder test (FIG. 4A), and in 2 weeks for the rotameter test (FIG. 4C), while the few effects demonstrated in the literature with progenitor grafts show a behavioral improvement after about 20 weeks (Kriks et al. 2011, Grealish et al. 2014, Kirkeby et al. 2017, Doi et al. 2014).

Figure 4D:
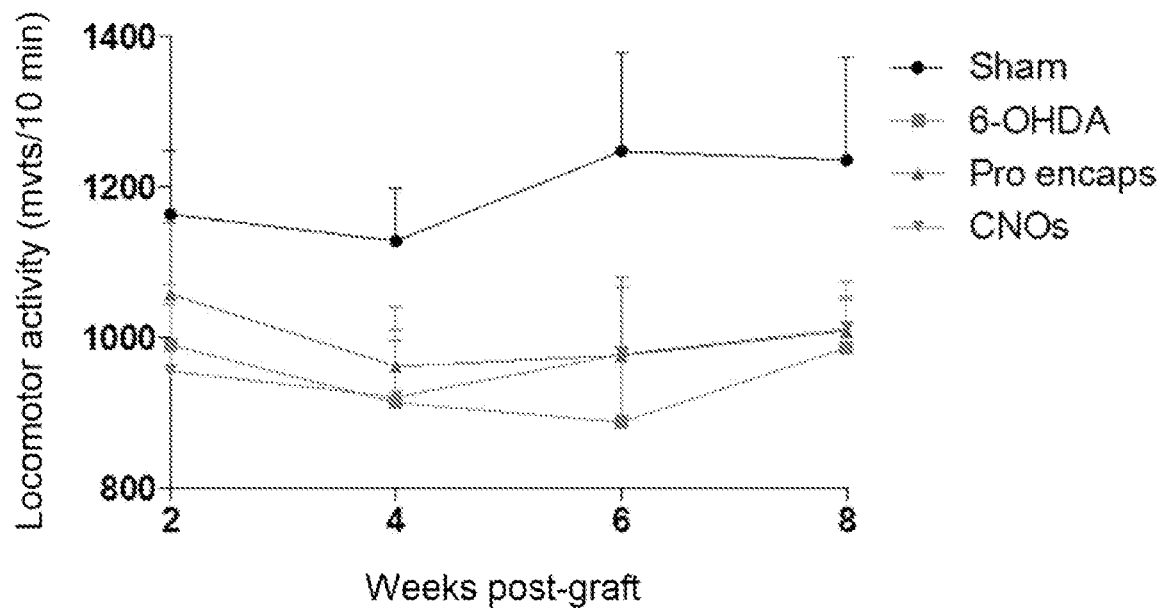
Figure 4E:
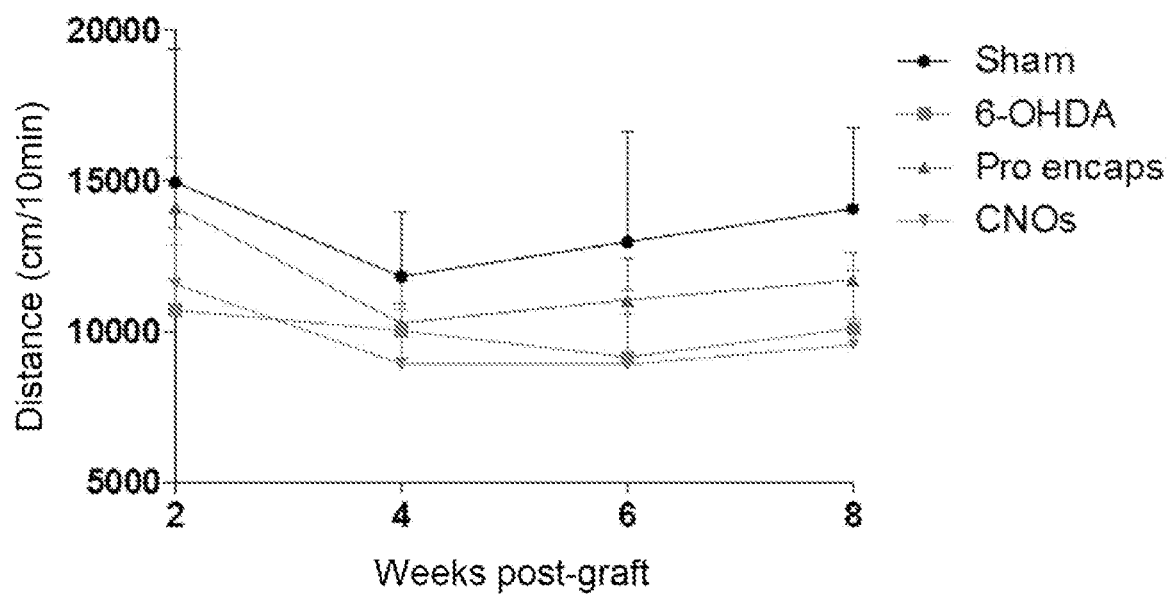

As expected, the transplants according to the invention, on the other hand, have no effect on anxiety outcomes (FIG. 4D and FIG. 4E).

Histological Results

Histological analysis of the grafts performed in the two CNO and Pro-encaps groups shows the presence of 10 to 15% TH neurons in the grafts. For comparison, previously published studies describe TH neuron levels after progenitor transplantation as about 5% (Kirkeby et al. 2017) or 6% (Kriks et al. 2011).

Figure 3:
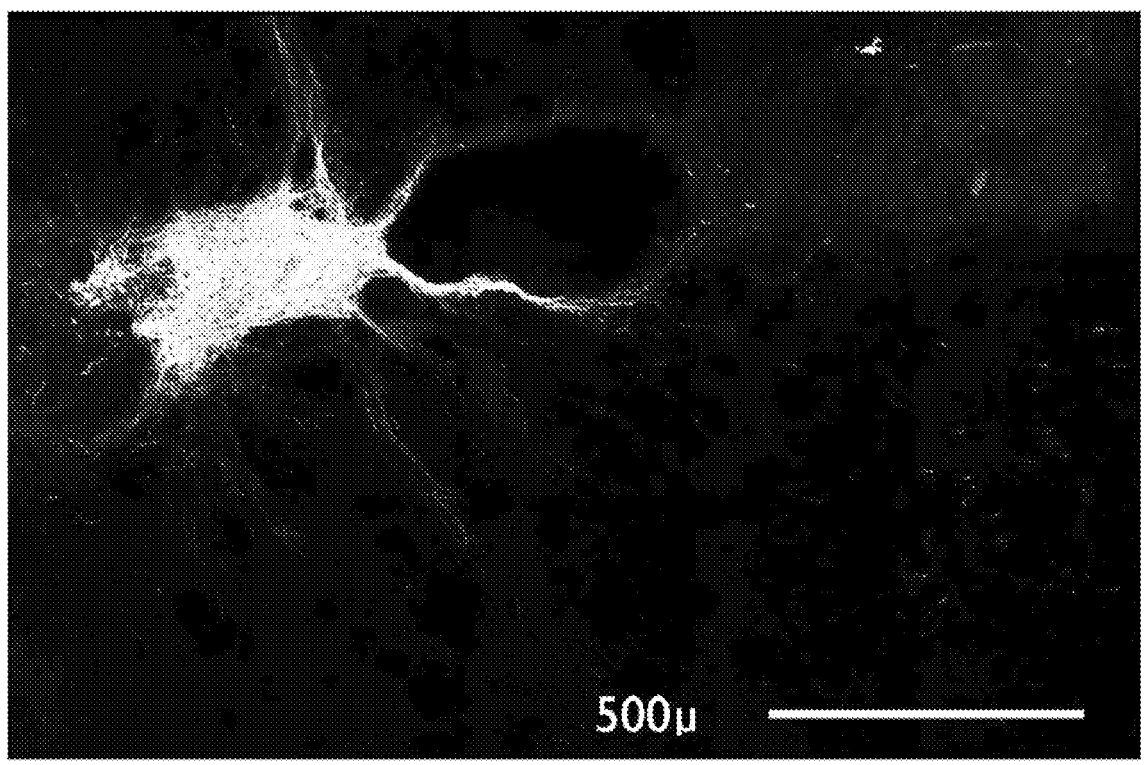
FIG. 3 is a micrograph showing the multi-millimeter axonal projections of human neurons 6 days after the transplantation of an implantable neural unit according to the invention (in this example of the CNO type) into the central nervous system of a rat rendered parkinsonian (6-OHDA CNOs). This is a confocal image of a section of rat striatum in the graft area, fixed, frozen and cut with a cryostat, revealed by histochemistry with an antibody against human cytoplasm (HCM)

The analysis of neuronal survival shows that after 6 days of transplantation, pluri-millimetric axonal projections are observed in the brains of CNO rats (FIG. 3), which confirms the significant survival of neurons after transplantation according to the invention.

We claim:

1. A neural tissue unit for use in cell therapy, wherein the neural tissue unit is implantable in the nervous system of a human or non-human mammal, wherein said neural tissue unit contains differentiated post-mitotic neuronal cells, having a phenotype of interest corresponding to the phenotype of defective cells to be replaced, and glial cells, said post-mitotic neuronal cells and glial cells being organized in a three-dimensional array in an extracellular matrix, said unit being obtained from a cellular microcompartment comprising a hydrogel capsule surrounding a single neural tissue unit, said differentiated post-mitotic neuronal cells having been obtained from mammalian pluripotent stem cells differentiated into post-mitotic neuronal cells within said hydrogel capsule and said hydrogel capsule being at least partially removed prior to use of said neural tissue unit.

2. The neural tissue unit for use according to claim 1, wherein the hydrogel capsule is completely removed prior to use of the neural tissue unit.

3. The neural tissue unit for use according to claim 1, wherein the neuronal cells form a cluster of differentiated post-mitotic neuronal cells that are organized in a three-dimensional array in an extracellular matrix with the glial cells.

4. The neural tissue unit for use according to claim 3, wherein the cluster of neuronal cells has a smallest dimension between 50 μm and 500 um plus or minus 10%.

5. The neural tissue unit for use according to claim 3, wherein the cluster of neuronal cells has a smallest dimension between 150 μm and 400 μm plus or minus 10%.

6. The neural tissue unit for use according to claim 3, wherein the cluster of neuronal cells has a smallest dimension between 200 μm and 300 μm plus or minus 10%.

7. The neural tissue unit for use according to claim 1, wherein said unit comprises between 10 and 100% of post-mitotic neuronal cells of the phenotype of interest.

8. The neural tissue unit for use according to claim 7, wherein said unit comprises between 50 and 100% of post-mitotic neuronal cells of the phenotype of interest.

9. The neural tissue unit for use according to claim 7, wherein said unit comprises more than 90% of post-mitotic neuronal cells of the phenotype of interest.

10. The neural tissue unit for use according to claim 1, wherein said unit comprises from 100 to 100,000 neuronal cells.

11. The neural tissue unit for use according to claim 1 for the treatment of a neurodegenerative disease.

12. The neural tissue unit for use according to claim 11, wherein said neurodegenerative disease is Parkinson's disease, Huntington's disease, amyotrophic lateral sclerosis (ALS), Alzheimer's disease or a neuronal ceroid lipofuscinosis.

13. The neural tissue unit for use according to claim 12, wherein the neuronal ceroid lipofuscinosis is Batten's disease.

14. The neural tissue unit for use according to claim 12, wherein said neural tissue unit contains dopaminergic neurons for treating Parkinson's disease.

15. The neural tissue unit for use according to claim 12, wherein said neural tissue unit contains GABAergic neurons for treating Huntington's disease.

16. The neural tissue unit for use according to claim 1, wherein said neural tissue unit contains genetically modified neuronal cells.

17. A method for preparing the neural tissue unit defined according to claim 1 for implantation in the nervous system of a subject, said method comprising the steps of:
(1) producing cellular microcompartments comprising within a hydrogel capsule, extracellular matrix and human or non-human mammalian cells, capable of differentiating into neuronal cells;
(2) inducing cellular differentiation within the cellular microcompartment, so as to obtain post-mitotic neuronal cells having at least one phenotype of interest;
(3) at least partially removing the hydrogel capsule in order to recover the neuronal cells as a neural tissue unit.

18. The method for preparing the neural tissue unit according to claim 17, wherein the neuronal cells are immuno-compatible with the mammal intended to receive the neural tissue unit.

19. The method for preparing the neural tissue unit according to claim 17, comprising the further step of:
(4) loading a surgical implant device with at least one neural tissue unit.

20. The method for preparing the neural tissue unit according to claim 19, wherein the surgical implant device is loaded in step (4) with at least 10 to 1000 neural tissue units.

21. The method for preparing the neural tissue unit according to claim 19, wherein the surgical implant device is loaded in step (4) with between 10 and 100 neural tissue units.

22. The method for preparing the neural tissue unit according to claim 17, comprising the further step of:
(5) freezing the neuronal cells in the form of a tissue unit, before or after the at least partial removal of the hydrogel capsule.

23. The method for preparing the neural tissue unit according to claim 17, wherein the cells used in step (1) were previously taken from a human or non-human mammal in which the neural tissue unit is to be implanted.

24. The method for preparing the neural tissue unit according to claim 17, comprising the intermediate step of:
checking the phenotype of the neuronal cells contained in the hydrogel capsule, after step (2) of cellular differentiation.

25. The method for preparing the neural tissue unit according to claim 17, wherein the cells are differentiated into dopaminergic cells or GABAergic cells.

26. A kit for implanting neural tissue units comprising at least one cellular microcompartment comprising at least one hydrogel capsule enveloping an implantable neural tissue unit containing differentiated post-mitotic neuronal cells having a phenotype of interest corresponding to the phenotype of defective cells to be replaced, and glial cells, said post-mitotic neuronal cells and glial cells being organized in a three-dimensional array in an extracellular matrix, said differentiated post-mitotic neuronal cells having been obtained from mammalian pluripotent stem cells differentiated into post-mitotic neuronal cells within said hydrogel capsule, and means for at least partially removing the hydrogel capsule.

27. The kit for implanting neural tissue units according to claim 26, further comprising a surgical implant device suitable for implanting the neural tissue unit in the nervous system of a mammal.

28. A kit for implanting neural tissue units comprising at least one implantable neural tissue unit containing differentiated post-mitotic neuronal cells having a phenotype of interest corresponding to the phenotype of defective cells to be replaced, and glial cells, said post-mitotic neuronal cells and glial cells being organized in a three-dimensional array in an extracellular matrix, said unit having been obtained from a cellular microcompartment comprising a hydrogel capsule surrounding a single neural tissue unit, said differentiated post-mitotic neuronal cells having been obtained from mammalian pluripotent stem cells differentiated into post-mitotic neuronal cells within said hydrogel capsule and said hydrogel capsule having been at least partially removed, in a surgical implant device suitable for implanting the neural tissue unit(s) in the nervous system of a mammal.

29. The kit for implanting neural tissue units according to claim 28, comprising between 1 and 10,000 neural tissue units.

30. The kit for implanting neural tissue units according to claim 28, comprising between 10 and 1,000 neural tissue units.

* * * * *